No. 789,637. PATENTED MAY 9, 1905.
I. SHOOB.
BURNER FOR INCANDESCENT GAS LIGHTS OR FOR HEATING PURPOSES.
APPLICATION FILED APR. 13, 1904.

2 SHEETS—SHEET 1.

Witnesses:
C. H. Griesbauer.

Inventor
Isaac Shoob
by H. R. Willson
Attorney

No. 789,637. Patented May 9, 1905.

UNITED STATES PATENT OFFICE.

ISAAC SHOOB, OF LONDON, ENGLAND.

BURNER FOR INCANDESCENT GAS-LIGHTS OR FOR HEATING PURPOSES.

SPECIFICATION forming part of Letters Patent No. 789,637, dated May 9, 1905.

Application filed April 13, 1904. Serial No. 203,042.

*To all whom it may concern:*

Be it known that I, ISAAC SHOOB, a subject of the King of Great Britain and Ireland, residing at 123 Wardour street, London, W., England, have invented certain new and useful Improvements in Burners for Incandescent Gas-Lights or for Heating Purposes, (for which I have made application for Letters Patent in Great Britain, No. 24,228, bearing date November 7, 1903,) of which the following is a specification.

This invention relates to burners for heating or lighting purposes, and more especially to those employed for inverted incandescent gas-lights.

It is found that inverted incandescent gas-burners as hitherto constructed burn best when in a vertical position, but if tilted or inclined to one side or the other have a tendency to smoke, a defect believed to be due to the fact that the flow or passage of fresh air to the mixing-cone is disturbed when the burner is moved out of the vertical position.

The object of the present invention is to provide a burner in which the regular supply of air to the mixing-cone may be secured, so as to obtain an intensified light into whatever position the burner may be moved or placed. The burner may then be secured in any desired stationary position or connected up to a flexible or other suitable pipe and then moved into various positions without ill effect, thus rendering the burner applicable as a portable gas-lamp for lighting or heating purposes, such portable gas-lamp when used for lighting purposes being advantageous for throwing a light onto the floor or in various directions for searching purposes.

Figure 1:
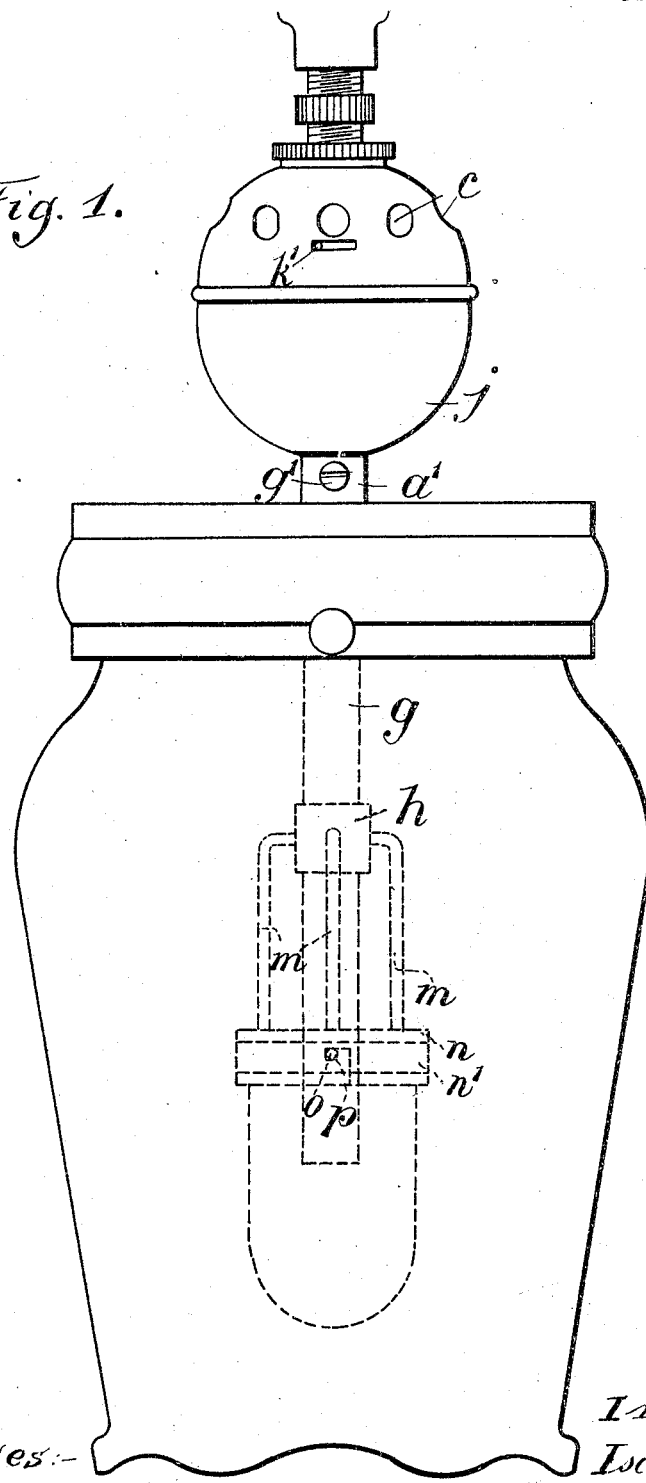
Figure 2:
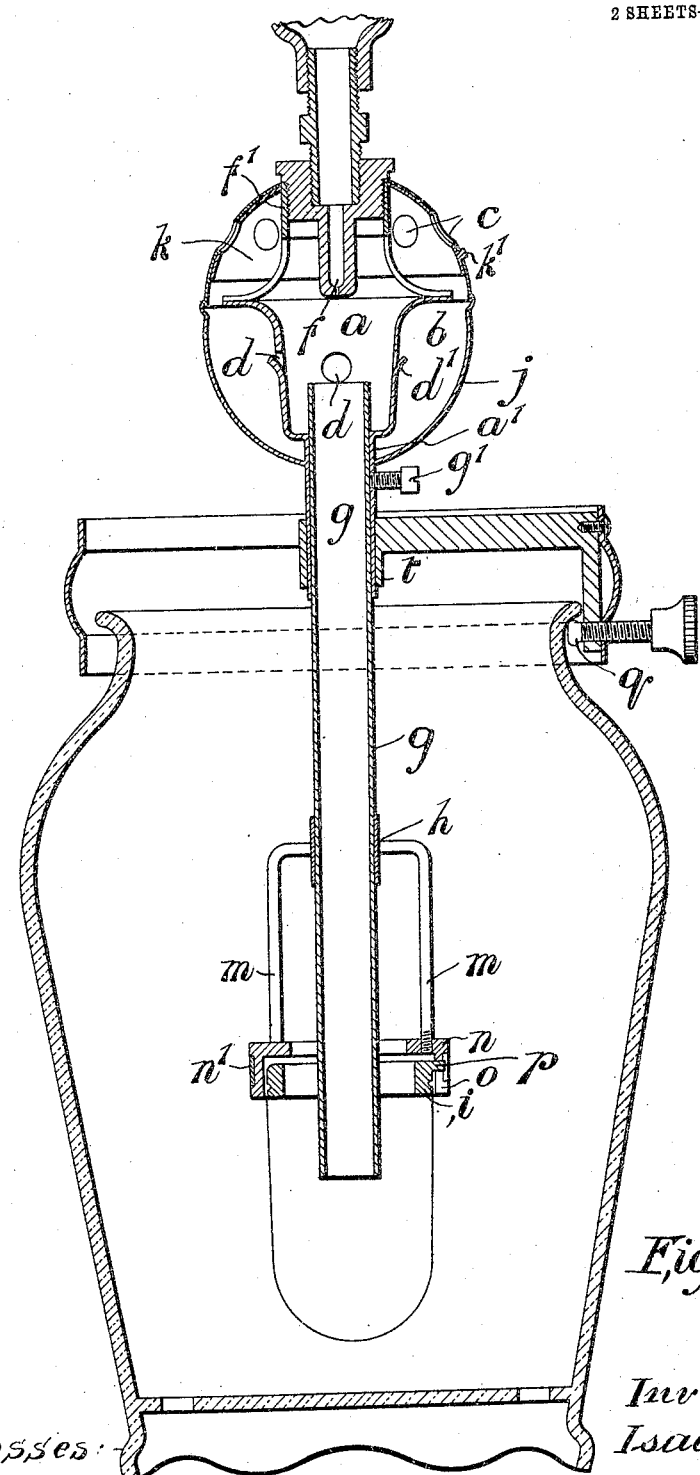

In the accompanying drawings, Figure 1 is a side elevation of a lamp made in accordance with my invention. Fig. 2 is a central vertical section of the same.

In carrying out my invention a mixing cone or funnel *a* is disposed or inclosed within an air-chamber *b*. This air-chamber is perforated at or near the top, as at *c*, to afford a free passage for fresh air. The mixing-cone has lateral openings *d*, which may be circular holes or formed by semicircular cuts, leaving lips *d'*. Air can enter the chamber *b*, and some of it coming in contact with the lower part *j*, which acts as a deflector for the ascending heated waste gases when the burner is vertical, becomes heated before entering the cone *a* and insures an intensified light.

An air-inlet regulator is provided in the form of a perforated shutter *k*, moved and guided by pins *k'*, projecting through slots in the chamber *a*. By adjusting the position of the shutter relatively to the holes *c* the air-supply may be set or altered.

The gas-nozzle *f* may be secured into the air-chamber in any suitable manner. As shown in Fig. 2, the nozzle *f* is screwed into a ring *f''*, carried by ribs or arms projecting from the mixing-cone. This arrangement affords a convenient method of attachment for the various parts. The cone *a* terminates below in a tube *a'*, which may form the burner-tube, but is preferably adapted to receive another tube, *g*, sliding therein and secured in the adjusted position by a set-screw *g'*. As shown in Fig. 2, the upper end of the tube *g* may project a short distance into the cone *a*, while its lower end should project a short distance within the mantle, so as to be well surrounded by the mantle.

To prevent the mantle from becoming disturbed or falling out of position when the burner is moved or placed in an inclined direction, I prefer to attach it firmly to the holder by means of a locking-ring or keep. On or near the end of the burner-tube *g* and adjustably secured by a set-screw is a sleeve *h*, from which a ring *n* is suspended by bars or wires *m*, which may be telescopic or similarly adjustable. The holder or ring *n* is provided with bayonet-slots *o* for the reception of pins or porjections *p* on the mantle-carrying ring *i* or on a metal ring secured thereto. A loose keep or ring *n'*, slotted at corresponding parts to the bayonet-slots in the ring *n*, is adapted to be slightly rotated to lock the pins or projections *p* in the bayonet-slots to prevent shifting of the mantle-ring when the burner is moved out of the vertical position or employed as a portable lamp, in which latter case the gas-pipe is made flexible. A spider globe ring or gallery is also adjustably carried upon the tube $a'$. It may have a sleeve $t$, secured by a set-screw. The globe is preferably held in position by binding-screws, which have points $q$, of insulating material, to obviate fracture of the globe after the light is turned off. Such fracture usually occurs when ordinary screws are used, owing to the metal-work remaining hot after the glass globe has cooled. The screws may be drilled out for a part of their length and a a small plug or tip $q$, of asbestos or earthenware, fitted therein.

By disposing the mixing-cone within an outer chamber the supply of air to such cone is uninterrupted and regular, cross-currents or drafts not interfering with the flow thereto, and the air may also be in part preheated.

Having now described my invention, what I claim as new, and desire to secure by Letters Patent, is—

1. A gas-burner comprising a mixing-cone having perforations therein, a tube adjustably fitted in said cone, an inclosing cap surrounding said cone and provided with air-inlet openings located above the plane of the perforations in the cone, substantially as described.

2. A gas-burner comprising a mixing-cone provided with perforations, a tube adjustably fitted in said cone, and an inclosing cap and deflector surrounding said cone and provided with air-inlet openings, said perforations and openings being in different planes, substantially as described.

3. A gas-burner, comprising a mixing-cone provided with a series of perforations, a tube adjustably fitted into said cone, an inclosing cap surrounding said cone and having a set of air-inlet openings out of alinement with the perforations, and a sliding shutter for varying the size of the inlet-openings, substantially as described.

In witness whereof I have hereunto set my hand in presence of two witnesses.

ISAAC SHOOB.

Witnesses:
 ALBERT E. PARKER,
 FRANCIS J. BIGNELL.